United States Patent Office 3,671,275

Patented June 20, 1972

3,671,275

LOSSY DIELECTRIC STRUCTURE FOR DISSIPATING ELECTRICAL MICROWAVE ENERGY

Louis E. Gates, Jr., Inglewood, and William E. Lent, Los Angeles, Calif., assignors to Hughes Aircraft Company, Culver City, Calif.

No Drawing. Continuation-in-part of application Ser. No. 586,649, Oct. 14, 1966. This application Dec. 12, 1969, Ser. No. 884,715

Int. Cl. C04b *35/14*

U.S. Cl. 106—44 5 Claims

ABSTRACT OF THE DISCLOSURE

A lossy dielectric attenuator for receiving and dissipating high power wave energy on the order of 100 watts and more comprised of the combination of silicon carbide in an alumina matrix.

This application is a continuation-in-part of Ser. No. 586,649 (now Pat. No. 3,538,205).

The invention herein described was made in the course of or under a contract or subcontract thereunder with the Navy Department.

This invention relates to improvements in the method of increasing the efficiency of lossy dielectric materials in dissipating high power electrical microwave energy and the products obtained thereby. More particularly, the improvements concern the critical methods of providing an improved lossy dielectric material having the surprising ability to dissipate continuous power wattage on the order of 100 to 1800 watts without requiring external water cooling and can be operated under conditions up to 1200° C. without undergoing physical damage, in comparison to any known commercially available material not having this ability.

In the technical field for microwave devices and components, the prior art has devised porous ceramic structures with carbonized sugar, metal oxides and carbides, oxidized nickel-iron alloys in sheet or wire form, and metallic surfaces coated with graphite. However, such structures have characteristics which reduce their use in airborne structures and particularly for use in dissipating high power microwave loads and as attenuators and terminations in traveling wave tubes.

It is accordingly an object of this disclosure to provide the art with a method of fabricating improved lossy dielectric material which improves the efficiency of high power electrical energy dissipation and high thermal conductivity under conditions of continuous wave power.

Another object of this improvement in the art is to provide an improved method of processing for obtaining improved lossy dielectric compositions having high thermal conductivity for efficient absorption and dissipation of heat energy generated under conditions of continuous high energy wave power and environment and induced high temperatures.

A further object of this improvement in the art is to provide a critical method of preforming lossy dielectric compositions for obtaining maximum thermal conductivity, minimizing porosity and attaining high uniform density to more efficiently absorb and dissipate high power microwave electrical energy.

Further, additional objects and advantages will be recognized from the following description wherein the examples are given for purposes of illustrating the improved methods and compositions embodied herein. To the accomplishment of the foregoing and related ends, this invention then comprises the features hereinafter more fully described and inherent therein, and as particularly pointed out in the claims. Such illustrative embodiments being indicative of the various ways in which the principle of our discovery, invention or improvements may be employed.

In general, the lossy dielectric composition of this disclosure consists essentially of critically prepared dielectric matrix and silicon carbide mixtures to provide a lightweight lossy dielectric of uniformly reproducible strength and properties. The disclosure consists essentially of the method for providing a matrix of selective materials whereby the dielectric properties are adjusted within certain limits to obtain improved operating characteristics for microwave attenuators or high power loads. The dielectric constant of the resulting material is within the range 9 to 20 and the loss tangents within the range 0.005 to 0.600, thus providing a range of property values capable of accommodating a wide spectrum of high power microwave energy absorption. Microwave attenuators absorb only a portion of the energy to prevent unwanted oscillations, usually at selected frequencies. Microwave loads (or terminations) are broadband devices designed to absorb and dissipate as heat as much energy as possible. The essential, unusual feature of our materials is that they combine an outstanding range of electrical properties with high density and high thermal conductivity, as a unique combination, not heretofore known to be obtained in the art.

The proportions of matrix and conducting granules vary to provide the required dielectric properties. Attenuators require from approximately 1% to 35% by weight of conducting granules. Loads generally require conducting granules in greater amounts up to about 80%. Thus, in the matrix herein provided the silicon carbide granules may vary from 1 to 80%. It is most important that the conducting granules be uniformly dispersed during the mixing operation so that all particles are separated and surrounded by dielectric matrix. Otherwise, the composite will act as a metallic conductor and will reflect rather than absorb energy. The initial preparation of preforming or molding and sintering operations in the preferred compositions are critical from the standpoint of attaining the highest uniform density to maximize thermal conductivity, strength and hardness, and to minimize porosity.

The following detailed descriptions are illustrative of processes and compositions used to prefabricate the herein provided improved lossy dielectric matrix expressed in grams (parts) matrix in which granules of an electrically conducting silicon carbide are essentially uniformly distributed and encapsulated.

EXAMPLE 1

Pregrind

Grind the following ingredients for 16 hours at 55 r.p.m. in a clean, one-gallon porcelain ball mill jar containing 5500 grams of alumina grinding media:

| | Grams |
|---|---|
| Alumina, 900 mesh * | 755.2 |
| Manganese dioxide powder | 18.4 |
| Titanium dioxide powder | 18.4 |
| Bentonite | 8.0 |
| Water soluble organic binder (powder) | 8.0 |
| Distilled water (sufficient to form a paste) | 950.0 |

*About 94% based on dry weight of added ingredients.

Final grind

Add the following and grind an additional two hours:

| | Grams |
|---|---|
| Silicon carbide grain, 280 mesh | 800 |
| Microcrystalline wax emulsion, 46½ solids concentration (commercial grade) | 112 |

Drying

Drain slip from mill into a glass or porcelain enamelled steel container and then dry at 100–120° C. in an air convection oven for 20–24 hours.

Granulation

Pare off surface crust from the dried cake. Crush the remaining cake until it passes through an 8 mesh screen. Then alternately crush and screen until the dried material is sized between 28 mesh and 80 mesh for pressing.

Pressing

Press bars in a 2" x 1$\frac{3}{16}$" steel die using 65 grams of the sized grain at 30 tons total pressure.

Organic burnout

Place pressed bars on a screen wire rack in an air convection over. Heat to 140° C. in 4 hours at the rate of 30° C. per hour. Hold temperature at 140° C. for 20–24° hours, then increase temperature to 540° C. at the rate of not more than 100° C. per hour. Remove from oven after cooling below 140° C.

Firing

Place preburned bars on zirconia coated-silicon carbide kiln setters. Fire to 1400° C. for about one hour or until the pyrometric cone (15) is down.

The water soluble organic binder is added to the composition of Example 2, in powder form and is a synthetic or natural organic material, as gum arabic, gum tragacanth, polyvinyl alcohol, methyl, ethyl and the like cellulose and water soluble salts thereof, dextrin, sugar, polyethylene glycol, and the like, and mixtures of such binder materials as are commercially available and known to the art.

The composition of Example 1 may be modified as follows:

TABLE 1.—LOSSY ALUMINA CERAMIC COMPOSITION

| | Percent |
|---|---|
| Silicon carbide, 100 to 300 mesh | 1–85 |
| Alumina, 200 to 900 mesh | 15–99 |
| Manganese dioxide powder | 0–6 |
| Titanium dioxide powder | 0–6 |
| Feldspar | 0–20 |
| Calcium pyrophosphate | 0–20 |
| Nepheline syenite | 0–15 |
| Bentonite | .25–1 |

The material of Example 1 and following examples have been successfully used as a microwave load in an iso-duplexer to dissipate microwave reflections from an airborne radar antenna and as a high power broadband load material in the region of 100 watts or more average power dissipation, providing improved microwave switches and other electrical equipment. The material provides the appropriate dielectric constant and loss tangent for this application. The above fabrication process is more suitable for large production at lower cost than that of an alumina matrix. This material, so prefabricated, possesses a high capacity for heat dissipation and high mechanical strength in proportion to its weight for airborne and other electrical components. Although this formulation does not have quite the power dissipating capability of the material described as a magnesia matrix in a division application Ser. No. 814,830, now U.S. Pat. 3,634,566, it dissipates at least an order of magnitude of more power without failure than the best commercial material available when fabricated in essentially the same geometry.

Due to the improvement in thermal conductivity and ability to withstand high power loads of 100 watts or more average power dissipation, the composition of Example 1 provides an improved high power broadband load material for thermostatic switches and other electrical applications.

The combination of advantages of the material construction are indicated as follows:

(1) The material is unusually efficient in converting microwave energy to thermal energy. Size and weight of components can be greatly reduced.

(2) The material is very refractory and will therefore perform satisfactorily at high temperatures generated at high power levels during continuous operation. The material can be operated to 1200° C. without undergoing physical damage.

(3) The material inherently has a high thermal conductivity for efficient dissipation of the heat generated.

(4) The material is easily outgassed and does not interfere with typical bakeout cycles used in processing microwave power amplifier tubes. The outgassing products (principally sorbed gases) are readily removed.

(5) The material, being dense and hard, is readily machined to precision dimensions required for repeatability in performance.

(6) The formulation process described herein assures excellent reproducibility in preparing subsequent batches of the material.

(7) The material can be metallized and brazed into a metal enclosure which improves heat dissipation and resistance to shock and vibration.

(8) The material is very strong and rugged.

(9) The material has a thermal expansion that is compatible with other materials of construction in microwave devices.

(10) The dielectric properties of the material may be adjusted by composition changes so that matching the material to a particular application is possible.

Additional examples illustrative of attenuator formula are provided by the following:

EXAMPLE 2

| | Batch grams |
|---|---|
| Alumina particles | 755 |
| $MnO_2$ | 18 |
| $TiO_2$ | 18 |
| Feldspar | 100 |
| Bentonite | 8 |
| Organic gum | 8 |
| Distilled water | 1000 |

Grind approximately 16 hours.
Open mill and add:

| | |
|---|---|
| Carborundum fines | 1800 |
| Plus bentonite | 8 |
| Plus acetic acid, 10 drops. | |

Grind 1 hour.
Dump, dry, granulate and follow the procedure of Example 1.
Fire at 1300° C.–1400° C., as described.

EXAMPLE 3

Exactly the same as Example 2 except substitute nepheline syenite for feldspar.

Follow process as above described, and fire at 1250° C.–1350° C.

EXAMPLE 4

| | Percent | Batch, grams |
|---|---|---|
| Alumina | 42 | 672 |
| Calcium pyrophosphate | 8 | 128 |
| Plus water | | 900 |
| (Grind 16 hours) | | |
| Open mill and add: | | |
| Carborundum | 50 | 800 |
| Organic binder | | 112 |
| (Mill 2 hours) | | |

Dump, dry and granulate and follow the procedure of Example 1 and fire at 1350° C.–1450° C.

For a better understanding of the above in relationship to dielectric constant and other properties which an electrical engineer may require, the following table is illustrative of calculated dielectric constant of silicon carbide in the prepared ceramic.

TABLE 2

| For volume percent: | Cc./gm. |
|---|---|
| SiC at 3.17 sp. gravity | .315 |
| $Al_2O_3$ at 4.00 sp. gravity | .250 |

| Percent SiC: | Calculated dielectric constant |
|---|---|
| 0 | 9.0 |
| 10 | 13.2 |
| 20 | 18.6 |
| 30 | 26.6 |
| 40 | 37.2 |
| 50 | 51.3 |
| 60 | 68.6 |
| 70 | 90.6 |
| 80 | 119.0 |
| 90 | 176.0 |
| 100 | 200.0 |

As indicated, the preferred range of silicon carbide is on the order of about 1 or .5 percent to 35 percent, and up to about 50 percent, as illustrated, with variation in the fluxing agent, or agents, and amounts thereof, with or without the metal dioxide content. Thus, the dielectric constant can be controlled in the range of from about 9 to about 200 and herein preferably within the range of over 9 to about 20 with the loss tangents in the range of .005 to about .600. Microwave absorption efficiency is dependent not only on the SiC content but also on microwave frequency involved and geometry of the load or attenuator article. Frequency is a property of the combination system in which these materials are used, and load geometry along with composition must be changed or correlated in accordance with the microwave design and to meet microwave system requirements under operative conditions.

For general application in the combinations illustratively provided.

$$\text{resonant frequency} = \frac{1}{2.61a\sqrt{c\epsilon'}}$$

where $2.61a\sqrt{c}$ is a constant. Therefore resonant $$\text{frequency} = \frac{1}{\sqrt{\epsilon'}}\ (\text{dielectric constant})$$

or $$\epsilon' = \frac{1}{(\text{resonant frequency})}\ 2$$

By varying the flux material and utilizing relatively clean or pure water, some variations in the dielectric constant can be obtained. Such variation is under the control of the ceramic operator and made in accordance with the dielectric constant desired. More or less flux may be used, as may be required for the particular mixture and constant specified. It being understandable from the above table that the amount of silicon carbide content may vary over a large range or effect desirable dielectric constants and the particular flux or mixture of flux material and water is also dependent upon the particular mixture and results desired for obtaining the dielectric constant required.

As provided in the above examples, a dielectric constant can be obtained by variation in the amount of silicon carbide and relatively proper binder and flux material. That is, dependent upon the relative mixture, the flux content may be used in more or less amounts as will now be recognized by the ceramic engineer. The combinations provided being dependent upon the particular dielectric constant or range of constants required as an electrical property. Thus, now making it possible for the first time in the art to effectively transmit and receive high power messages.

Having described the present embodiments of our improvement in the art in accordance with the Patent Statutes, it will be apparent that some modifications and variations may be made without departing from the spirit and scope thereof. The specific embodiments described are given by way of examples illustrative of our discovery, invention or improvement which is to be limited only by the terms of the appended claims.

What is claimed is:

1. A dielectric attenuator article of a prefabricated fired lossy dielectric composition mixture capable of converting and dissipating as thermal energy high power electrical microwave energy of about 100 watts and more with a dielectric constant in the range of about 9 to 20 and loss tangents in a range of about 0.005 and 0.600 and high thermal conductivity, said fire composition consisting essentially of a fine grind mixture of at least two or more of inorganic particulate materials selected from the group consisting of 200 to 900 mesh alumina in a range of about 15 perecent to about 99 percent, 100 to 300 mesh silicon carbide from about 1 to about 85 percent, and at least one or more of manganese dioxide from 0 to about 6 percent, titanium dioxide from 0 to about 6 percent, calcium pyrophosphate from 0 to about 20 percent, nepheline syenite from 0 to about 15 percent, feldspar from 0 to about 20 percent, and bentonite from 0 to about 1 percent.

2. The article of claim 1 wherein the attenuator contains the three component system comprised of alumina, calcium pyrophosphate and silicon carbide.

3. The article of claim 1 wherein the attenuator contains the three component system comprised of alumina, nepheline syenite and silicon carbide.

4. The article of claim 1 wherein the attenuator contains the three component system comprised of alumina, feldspar and silicon carbide.

5. The article of claim 1 wherein the attenuator contains a fired lossy dielectric composition of alumina fines in the range of 15% to about 99% in combination with silicon carbide in the range from about 1% up to about 50%.

References Cited

UNITED STATES PATENTS

| | | | |
|---|---|---|---|
| 2,419,290 | 4/1947 | Schaefer | 106—46 |
| 2,898,217 | 8/1959 | Selsing | 106—46 |
| 2,947,056 | 8/1960 | Csordas et al. | 106—44 X |
| 2,979,414 | 4/1961 | Ryshkewitch et al. | 106—44 |
| 3,164,483 | 1/1965 | McCreight et al. | 106—44 |
| 3,238,049 | 3/1966 | Somers | 106—39 |
| 3,291,619 | 12/1966 | Luks | 106—46 |
| 3,534,286 | 10/1970 | Holm et al. | 333—81 |
| 3,538,205 | 11/1970 | Gates et al. | 264—61 |

OTHER REFERENCES

Singer, F., et al.: Industrial Ceramics, New York, 1963 p. 1210.

Ryshkewitch, E.: Oxide Ceramics, New York, 1960, pp. 438–9.

TOBIAS E. LEVOW, Primary Examiner

W. R. SATTERFIELD, Assistant Examiner

U.S. Cl. X.R.

106—65; 252—504, 508; 264—61; 333—81 R